(12) United States Patent
Schroeder

(10) Patent No.: US 9,186,632 B2
(45) Date of Patent: Nov. 17, 2015

(54) DIESEL EXHAUST FLUID TANK BREATHER ASSEMBLY

(71) Applicant: CNH America LLC, New Holland, PA (US)

(72) Inventor: Luke A. Schroeder, Coal Valley (IL)

(73) Assignee: CNH Industrial America LLC, New Holland, PA (US)

( * ) Notice: Subject to any disclaimer, the term of this patent is extended or adjusted under 35 U.S.C. 154(b) by 43 days.

(21) Appl. No.: 14/103,237

(22) Filed: Dec. 11, 2013

(65) Prior Publication Data

US 2015/0159529 A1  Jun. 11, 2015

(51) Int. Cl.
*B01D 46/00* (2006.01)
*B01D 69/02* (2006.01)
*B60K 15/035* (2006.01)
*B01D 53/22* (2006.01)

(52) U.S. Cl.
CPC .......... *B01D 69/02* (2013.01); *B60K 15/03504* (2013.01); *B01D 53/229* (2013.01); *B01D 2325/38* (2013.01); *F01N 2610/1406* (2013.01); *F01N 2610/1466* (2013.01)

(58) Field of Classification Search
CPC .. B01D 39/18; B01D 39/163; B01D 39/1615; B01D 39/2024; B01D 39/2037; B01D 46/0068; B01D 46/2411; B01D 46/521; B01D 46/10; B01D 2279/60; B01D 2239/0216; B01D 2239/0668; B01D 2275/10
USPC ......... 55/486, 385.4, 418, 495, 524, DIG. 17; 96/134, 147; 210/321, 336
See application file for complete search history.

(56) References Cited

U.S. PATENT DOCUMENTS

| | | | | |
|---|---|---|---|---|
| 4,689,057 A * | 8/1987 | Gasper | ............................ | 96/119 |
| 5,373,830 A | 12/1994 | Denz et al. | | |
| 5,575,832 A * | 11/1996 | Boyd | ................................. | 95/91 |
| 7,981,182 B2 * | 7/2011 | Volchko | .......................... | 55/462 |
| 2006/0242933 A1 * | 11/2006 | Webb et al. | ...................... | 55/486 |
| 2012/0186677 A1 | 7/2012 | Wetzel et al. | | |
| 2014/0373491 A1 * | 12/2014 | Harbur et al. | ................... | 55/425 |
| 2015/0040765 A1 * | 2/2015 | Zastera et al. | ............... | 96/117.5 |

FOREIGN PATENT DOCUMENTS

| | | |
|---|---|---|
| DE | 4006465 A1 | 9/1991 |
| DE | 10 2008 044 167 A1 | 6/2010 |
| DE | 10 2010 047 348 A1 | 4/2012 |
| FR | 2958272 A1 | 10/2011 |
| WO | 9503949 A1 | 2/1995 |
| WO | 2011/078235 A1 | 6/2011 |
| WO | 2011/124770 A1 | 10/2011 |
| WO | 2012/084108 A2 | 6/2012 |
| WO | 2013/113525 A2 | 8/2013 |

* cited by examiner

*Primary Examiner* — Duane Smith
*Assistant Examiner* — Minh-Chau Pham
(74) *Attorney, Agent, or Firm* — Patrick M. Sheldrake; Seyed V. Sharifi T.

(57) ABSTRACT

A diesel exhaust fluid (DEF) delivery system includes a tank for DEF, usually a urea aqueous solution, and a pump receiving the DEF from the tank for pressurization and delivery through a nozzle to the exhaust system of a work machine. A breather assembly is provided for the DEF tank and includes a housing having an inlet for ambient air and a particle filter adjacent the inlet for filtering particles. A hydrophobic membrane is interposed between the particle filter and an outlet leading to the tank for preventing outflow of DEF vapor and condensate.

18 Claims, 3 Drawing Sheets

DIESEL EXHAUST FLUID TANK BREATHER ASSEMBLY

BACKGROUND OF THE INVENTION

1. Field of the Invention

The present invention relates to diesel exhaust fluid (DEF) delivery systems, and, more particularly, to breather assemblies for such systems.

2. Description of the Related Art

As the Environmental Protection Agency (EPA) regulations covering combustion engine emissions are applied to ever more applications, the agricultural art and more broadly work machines are being required to comply with the EPA emissions limits already applied to on-highway vehicle applications. Many approaches have been proposed, but a cost-effective one is utilizing diesel exhaust fluid (DEF) injected into the exhaust stream of a diesel engine and providing a chemical reaction with the exhaust stream to enable a downstream SCR to produce appropriate reductions in nitrous oxide emissions.

One of the keys to this approach is the DEF delivery system. Current systems include a tank for the DEF, a pressure pump and a nozzle for injecting the DEF into the diesel exhaust system. Typical systems incorporate a control system for coordinating the injection of DEF with appropriate engine duty cycles so that the proper chemical reactions may take place. The DEF is typically a urea-aqueous solution that, while nonflammable, poses several application challenges.

The tanks for the DEF are rigid and as a result must include a breather assembly to permit ingress of air as the DEF is depleted from the tank. While this approach has been relatively straightforward for on-highway applications, the use in a work machine such as an agricultural combine presents unique problems. These problems are associated with the ambient air which has significant particulate contaminants of both a microscopic and macroscopic size. Existing systems may utilize hydrophobic membranes on the breather assembly to prevent outflow of the DEF vapors and condensate. However, such a system does not take into account the particulates that may be drawn into the breather assembly and clog the hydrophobic membrane. Such a restriction can cause the interior pressure of the DEF tank to be lowered to a point where proper delivery of the DEF to the exhaust flow is inhibited.

Likewise, breather assemblies that use a particulate filter permit DEF vapors and condensate to permeate the filter, thus causing crystal buildup and eventual clogging.

What is needed in the art, therefore, is a system for breather assemblies that operates efficiently and effectively in the work machine environment.

SUMMARY OF THE INVENTION

The present invention provides a simplified and reliable DEF breather assembly for the work machine environment and more particularly for agricultural combines.

The invention, in one form, is directed to a breather assembly for a diesel exhaust fluid (DEF) tank, including a housing having an inlet for ambient air, and interior chamber and an outlet fluidly connectable to the DEF tank. A particle filter is positioned adjacent the ambient air inlet for filtering particles from the air entering the interior chamber and an hydrophobic membrane in the chamber is interposed between the particle filter and the outlet for preventing the DEF vapors and condensate from passing to the ambient.

The invention, in another form, is directed to a diesel exhaust fluid (DEF) delivery system including a tank for DEF, a pump receiving DEF from the tank and a nozzle for delivering the DEF to the exhaust system of a engine for a work machine. The DEF system includes a breather assembly fluidly connected to the DEF tank and having a housing with an inlet for ambient air, an interior chamber and an outlet connected fluidly connected to the DEF tank. A particle filter is positioned adjacent the ambient air inlet for filtering particles from the air entering the interior chamber. A hydrophobic membrane is positioned in the chamber and interposed between the particle filter and the outlet for preventing DEF vapors and condensate from reaching the particle filter.

BRIEF DESCRIPTION OF THE DRAWINGS

The above-mentioned and other features and advantages of this invention, and the manner of attaining them, will become more apparent and the invention will be better understood by reference to the following description of several embodiments of the invention taken in conjunction with the accompanying drawings, wherein.

Corresponding reference characters indicate corresponding parts throughout the several views. The exemplifications set out herein illustrate several embodiments of the invention and such exemplifications are not to be construed as limiting the scope of the invention in any manner.

DETAILED DESCRIPTION OF THE INVENTION

Figure 1:
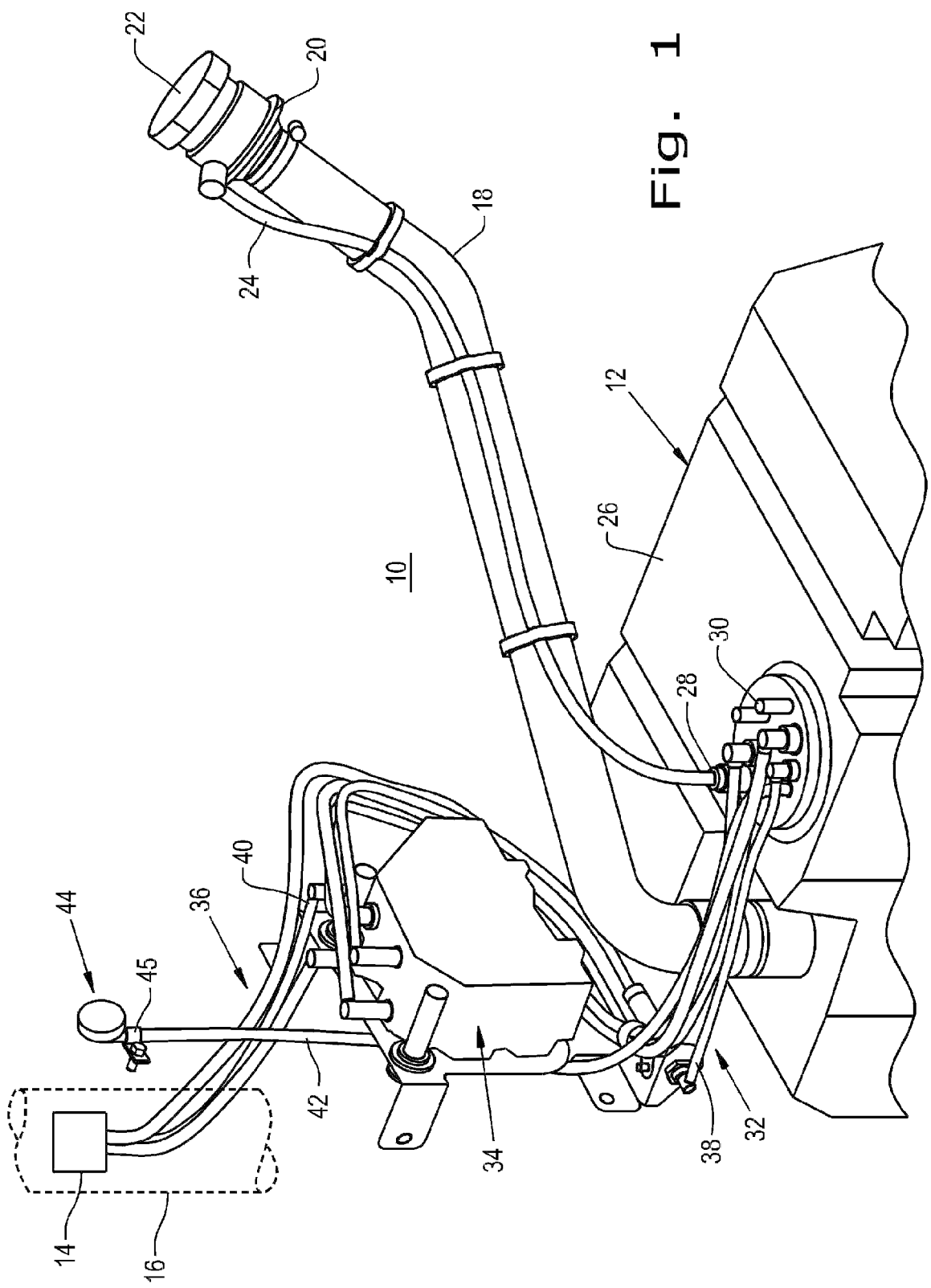
FIG. 1 is a perspective view of a DEF delivery system embodying the present invention.

Referring now to the drawings, and more particularly to FIG. 1, there is shown a DEF delivery system 10 including a storage tank 12 for DEF fluid for delivery to a nozzle 14 located in the exhaust stream 16 of a work machine which is not shown to enable a better understanding of the present invention. Typically, engines for work machines are compression ignition, or diesels because of their torque capacity, durability and fuel economy.

Preferably the work machine is an agricultural combine which traverses a field containing crops and harvests them for collection and delivery to market. As stated above, EPA emission regulations applied to on-highway vehicles are being phased in to the off-highway field.

The DEF delivered to nozzle 14 in the exhaust system 16 causes a chemical reaction with selective catalytic reduction (SCR) to achieve reductions in nitrous oxides and meet the EPA limitation. A discussion of the details of this process is not included to simplify the understanding of the present invention.

The DEF delivery system 10 has a filler tube 18 extending from tank 12 to terminate in end fitting 20 having a removable cap 22 to permit filling of the tank 12 in a manner similar to other replenishable fluids in a work machine environment. In order to provide proper venting of tank 12 during the filling process, a vent conduit 24 extends from a vent passage (not shown) in end fitting 20 to a fitting 28 on the top surface 26 of tank 12. Thus, when the tank 12 is being filled, the air above the liquid in tank 12 is expelled through conduit 24 to prevent an airlock.

The upper surface 26 of tank 12 has a removeable access plate 30 providing interconnections with a bundle of conduits 32 leading to a pump 34, usually electrically driven, that pressurizes DEF for injection and provides return flow. And outlet bundle of conduits 36 extends from the pump 34 to the nozzle assembly 14 in the exhaust 16. Of special interest in the bundle 32 is the suction line 38 for DEF leading to pump 34. In addition, there is a pressure line 40 in bundle 36 leading to nozzle assembly 14.

When tank 12 is full of DEF, cap 22 is secured on end fitting 20, thus sealing that part of the system. Pump 34 is actuated in accordance with control inputs from a controller (not shown) to deliver pressurized DEF to nozzle 14 for minimizing emissions. As the tank 12 is depleted of DEF, the space in the tank above the DEF needs to be connected to ambient and this is done by a breather tube 42 fluidly connected to access plate 30 and leading to breather assembly 44 and secured thereto by a fitting 45. Thus, when DEF is being delivered from tank 12, air is passing into tank 12 via breather assembly 44 and tube 42 to prevent inappropriate suction on pump 34.

Figure 2:
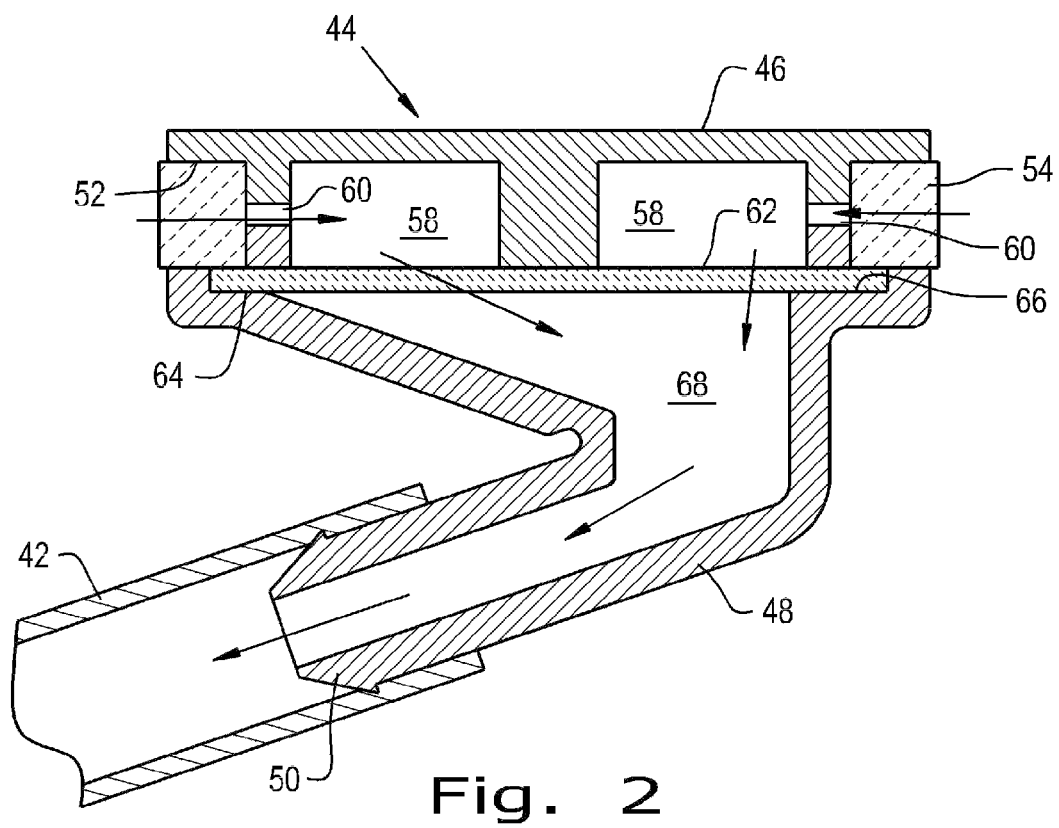
FIG. 2 is a cross-section view of one embodiment of a breather assembly used in the DEF delivery system of FIG. 1
Figure 3:
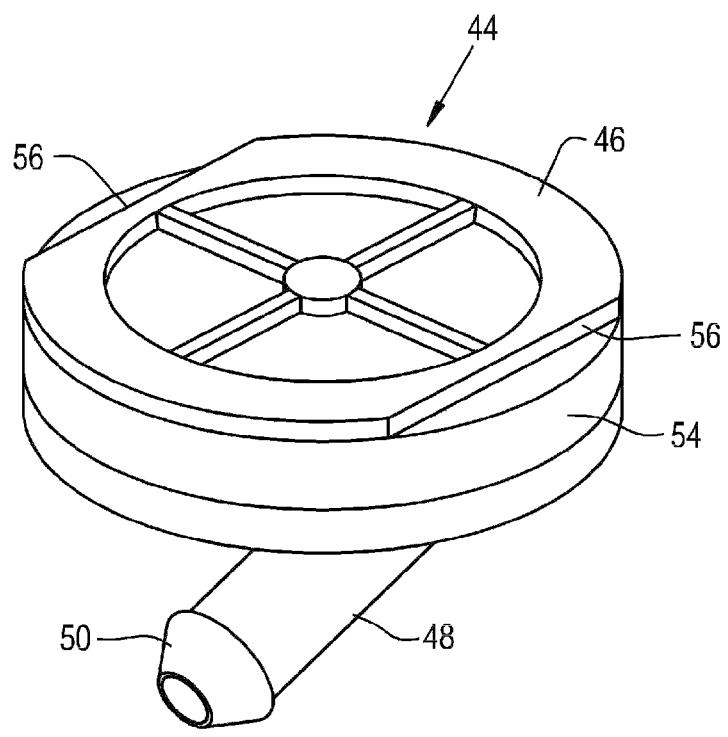
FIG. 3 is a perspective view of the breather assembly of FIG. 2.

In accordance with the present invention, the breather assembly 44 shown in FIGS. 2 and 3 is provided at the end of breather tube 42. Breather assembly 44 includes an upper housing 46 and a lower housing 48 having an end nipple 50 that is received in the end of breather tube 42. Upper housing 46 has an annular outer facing recess 52 that receives a foam ring 54 to prevent the ingress of particles to an interior chamber 58 of upper housing 46. As shown particularly in FIG. 3, upper housing 46 has flats 56 to enable and facilitate removal and replacement of the annular foam filter 54. A plurality of radially directed passages 60 extend from annular recess 52 to interior chamber 58 for the entry of ambient air.

An annular disk 62 of hydrophobic material is sandwiched and held between a shoulder 66 on lower housing 48 and lower annular faces 64 of upper housing 46 to be interposed between chamber 58 and a chamber 68 fluidly connected to breather tube 42 Hydrophobic disk 62 is formed from appropriate hydrophobic material that has the property of permitting the passage of air but preventing passage of the vapors and condensates from chamber 68.

An example of suitable hydrophobic material is Polytetrafluoroethylene (PTFE). It is a synthetic fluoropolymer of tetrafluoroethylene that has numerous applications. The best known brand name of PTFE is Teflon by DuPont Co. PTFE is a fluorocarbon solid, as it is a high-molecular-weight compound consisting wholly of carbon and fluorine. PTFE is hydrophobic: neither water nor water-containing substances wet PTFE.

The hydrophobic membrane 62 prevents outflow of DEF vapors and condensates to chamber 58 and the foam ring 54 prevents ingress of particles to chamber 58 and thus chamber 68 and the interior of tank 12. This arrangement is particularly suited for a work machine environment, especially for a combine in which straw, chaff and other debris from the field is ever present.

Figure 4:
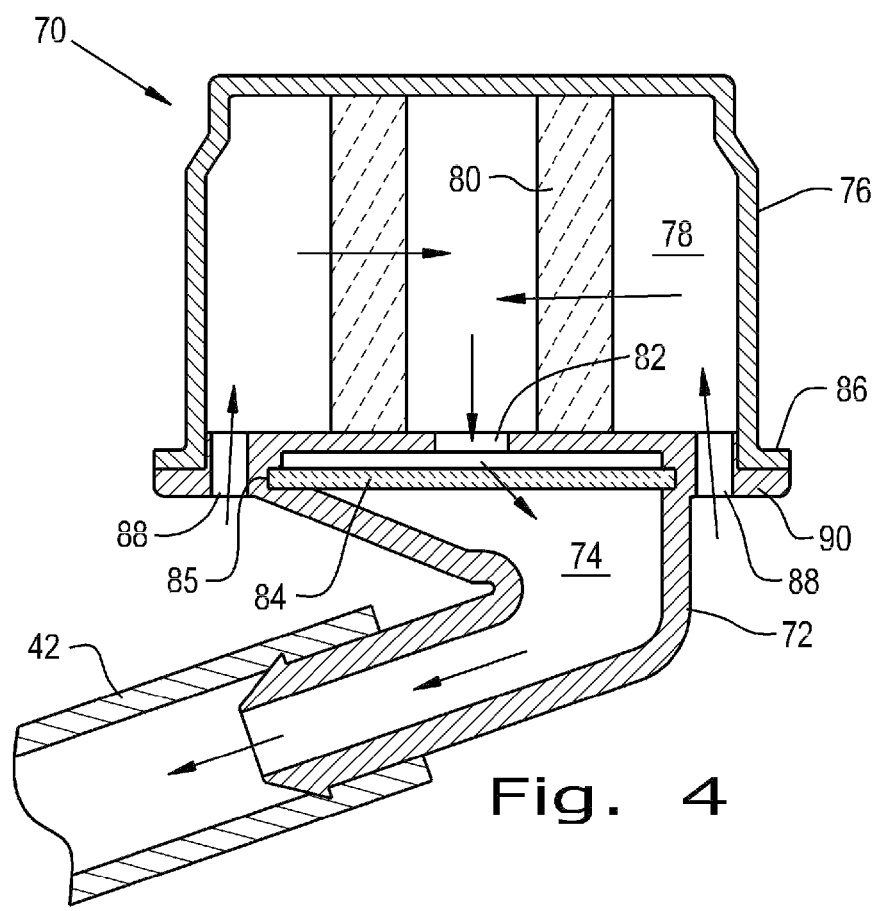
FIG. 4 is a cross-sectional view of an alternate embodiment of the breather assembly utilized in the DEF delivery system of FIG. 1.
Figure 5:
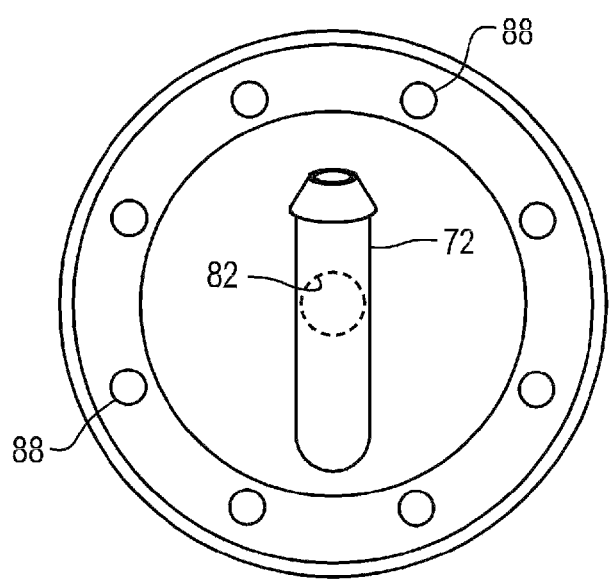
FIG. 5 is a plan view, in an upward direction, of the breather assembly of FIG. 4.

FIGS. 4 and 5 illustrate an alternative embodiment of the present invention. In these figures, a breather assembly 70 has a lower housing 72 and interior chamber 74 for connection with the breather tube 42. An upper housing 76 extends from lower housing 72 and forms an interior chamber 78 in which an annular filter 80, schematically illustrated, is positioned. Filter 80 may be formed from paper material of appropriate porosity and particle filtration for the breather application. The filter 80 surrounds a central passage 82 providing fluid flow to chamber 74. Housings 86 and 72 are removeably connected at flanges 86, 90, respectively by appropriate means (not shown) to enable replacement of paper filter 80.

A hydrophobic membrane 84 is received in an inwardly facing groove 85 in chamber 74 of housing 72. Thus, the hydrophobic membrane 84 prevents flow of aerosols and condensate from chamber 74 to the interior of filter 80. A series of openings 88, shown in FIG. 5, provide entry of air from the ambient to the interior chamber 78 of upper housing 76. The breather assembly 70 functions in a manner similar to that for breather assembly 44 in that it prevents the ingress of particulate matter ultimately into the interior of the tank and prevents outflow of DEF vapors or condensate which can cause crystallization and present flow restrictions in the system.

Both embodiments provide an effective reliable and economic way of providing a breather assembly for a DEF tank while at the same time minimizing, if not eliminating, the problems incurred with current systems providing the tank breathing function.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A breather assembly for a diesel exhaust fluid (DEF) tank, said breather assembly comprising:
   a housing having an inlet for ambient air, an interior chamber and an outlet fluidly connectable to the DEF tank;
   a particle filter positioned adjacent said ambient air inlet for filtering particles from the air entering said interior chamber; and,
   a hydrophobic membrane in said interior chamber interposed between said particle filter and said outlet for preventing outflow of DEF vapor and condensate to said interior chamber, said hydrophobic membrane being positioned so that outflow is in a direction lateral to the plane of said membrane and said outlet is lower than said hydrophobic membrane.

2. The breather assembly of claim 1 in which said particle filter is one of a paper filter and a foam filter.

3. The breather assembly of claim 2 wherein said particle filter is a foam filter.

4. The breather assembly of claim 3 wherein said housing is annular and has an annular outer facing recess for receiving an annular foam filter.

5. The breather assembly of claim 4 in which the annular housing has a pair of flat sections for facilitating removal and installation of said annular foam filter.

6. The breather assembly of claim 4 wherein said housing has a plurality of inlets extending radially inward from said outer facing annular groove to said interior chamber.

7. The breather assembly of claim 1 wherein said housing has upper and lower housings and said hydrophobic membrane is sandwiched between said upper and lower housing.

8. The breather assembly of claim 2 wherein said particle filter is a paper filter.

9. The breather assembly of claim 8 having an upper and lower housing wherein said paper filter is positioned within said upper housing.

10. The breather assembly of claim 9 wherein said upper and lower housings have annular abutting flanges removable from one another for replacement of said paper filter.

11. A diesel exhaust fluid (DEF) delivery system comprising:
- a tank for DEF;
- a pump fluidly connected to said tank for pressurizing DEF;
- a nozzle fluidly connected to said pump for receiving pressurized DEF and delivering it to a work machine exhaust system;
- a breather tube fluidly connected to said tank;
- a breather assembly connected to the upper and of said conduit and comprising a housing having an inlet for ambient air, an interior chamber and an outlet fluidly connected to said breather tube, a particle filter positioned adjacent said ambient air inlet for filtering particles from air entering the interior chamber; and, a hydrophobic membrane in said interior chamber interposed between said particle filter and said outlet for preventing outflow of vapors and condensate to said interior chamber, said hydrophobic membrane being positioned so that outflow is in a direction lateral to the plane of said membrane and said breather tube is lower than said hydrophobic membrane.

12. The DEF delivery system of claim 11 wherein the particle filter is one of a foam filter and a paper filter.

13. The DEF delivery system of claim 12 wherein said filter is a foam filter.

14. The DEF delivery system of claim 13 wherein said housing is annular and has an outer facing annular recess for receiving said annular foam filter.

15. The DEF delivery system of claim 14 in which the annular housing has a pair of flat sections for facilitating removal and installation of said annular foam filter.

16. The DEF delivery system of claim 12 wherein the particle filter is a paper filter.

17. The DEF delivery system of claim 16 wherein the housing has upper and lower sections and wherein the paper filter is contained within said upper section.

18. The DEF delivery system of claim 17 wherein said upper and lower housings have annular abutting flanges removable from one another for replacement of said paper filter.

* * * * *